(12) United States Patent
Melander et al.

(10) Patent No.: US 10,516,607 B2
(45) Date of Patent: Dec. 24, 2019

(54) LAYER 3 SERVICE IMPLEMENTATION IN CLOUD SERVERS AND METHOD

(75) Inventors: Bob Melander, Sigtuna (SE); Enrique Eduardo Fernandez Casado, Solna (SE); Hareesh Puthalath, Solna (SE); Azimeh Sefidcon, Sollentuna (SE); Vinay Yadhav, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/385,614

(22) PCT Filed: Jul. 13, 2012

(86) PCT No.: PCT/IB2012/053611
§ 371 (c)(1),
(2), (4) Date: Sep. 16, 2014

(87) PCT Pub. No.: WO2013/153425
PCT Pub. Date: Oct. 17, 2013

(65) Prior Publication Data
US 2015/0067674 A1    Mar. 5, 2015

Related U.S. Application Data (60) Provisional application No. 61/623,124, filed on Apr. 12, 2012.

(51) Int. Cl.
*H04L 12/721* (2013.01)
*H04L 12/931* (2013.01)
(Continued)

(52) U.S. Cl.
CPC .......... *H04L 45/66* (2013.01); *G06F 9/45533* (2013.01); *G06F 9/45558* (2013.01);
(Continued)

(58) Field of Classification Search
CPC ............ H04L 63/2072; H04L 12/4641; H04L 12/5696; H04L 45/66; H04L 45/00;
(Continued)

(56) References Cited

U.S. PATENT DOCUMENTS 6,658,571 B1 * 12/2003 O'Brien .................. G06F 21/53
709/225
8,660,129 B1 * 2/2014 Brendel .............. H04L 12/4641
370/397

(Continued)

FOREIGN PATENT DOCUMENTS

| CN | 101430649 A | 5/2009 |
|---|---|---|
| WO | 2007/023467 A2 | 3/2007 |

OTHER PUBLICATIONS

M. Siraj Rathore, Markus Hidell, Peter Sjodin; "Performance Evaluation of Open Virtual Routers", IEEE Globecom 2010 Workshop on Network, pp. 288-293.*

(Continued)

*Primary Examiner* — Jacob D Dascomb
(74) *Attorney, Agent, or Firm* — Patent Portfolio Builders PLLC (57) ABSTRACT

A method, computer environment and cloud server configured to facilitate communication among plural networks established in the cloud server. The cloud server (400) includes hardware components (802) configured to process and store information; a hypervisor (430) configured to run on the hardware components (802) and also configured to provide a virtual platform in a kernel space (404); a first virtual machine (410) running on the virtual platform in a user space (402); a first L2aaS network (414) connected to the first virtual machine (410), the first L2aaS network (414) being located in the kernel space (404); a second virtual machine (416) running on the virtual platform in the user space (402); a second L2aaS network (418) connected to the (Continued)

second virtual machine (416), the second L2aaS network (418) being located in the kernel space (404); and a virtual router (424) located in the kernel space (404) and connected to the first L2aaS network (414) and the second L2aaS network (418). The virtual router (424) is configured to provide router functionality between the first and second L2aaS networks (414, 418).

17 Claims, 10 Drawing Sheets

(51) Int. Cl.
  *G06F 9/455* (2018.01)
  *G06F 9/50* (2006.01)
  *H04L 12/701* (2013.01)
  *H04L 29/08* (2006.01)
(52) U.S. Cl.
  CPC ............ *G06F 9/5077* (2013.01); *H04L 45/00* (2013.01); *H04L 49/70* (2013.01); *H04L 67/10* (2013.01); *G06F 2009/4557* (2013.01); *G06F 2009/45595* (2013.01)
(58) Field of Classification Search
  CPC ..... H04L 49/70; H04L 67/10; G06F 9/45558; G06F 9/45533; G06F 9/5077; G06F 2009/45595; G06F 2009/4557
  See application file for complete search history.

(56) References Cited

U.S. PATENT DOCUMENTS

| | | | |
|---|---|---|---|
| 9,154,327 B1* | 10/2015 | Marino | ................. G06Q 30/04 |
| 2011/0075664 A1 | 3/2011 | Lambeth et al. | |
| 2011/0075667 A1 | 3/2011 | Li et al. | |
| 2011/0243146 A1 | 10/2011 | Armstron et al. | |
| 2011/0265081 A1* | 10/2011 | Lucovsky | ................. G06F 8/60 |
| | | | 717/177 |
| 2013/0044759 A1* | 2/2013 | Reed | .................... H04L 69/167 |
| | | | 370/401 |

OTHER PUBLICATIONS

Terrence Mitchem, Raymond Lu, Richard O'Brien, "Using Kernel Hypervisors to Secure Application", 1997, Proceedings 13th Annual Computer Security Applications Conference (Year: 1997).*

International Preliminary Report on Patentability in corresponding International Application No. PCT/IB2012/053611 dated Oct. 23, 2014.

International Search Report Issued in corresponding International application No. PCT/IB2012/053611, dated Feb. 5, 2013.

Office Action in corresponding Chinese Application No. 201280072335.3 dated Nov. 8, 2016. (Reference US2011075664A1 was previously submitted with an Information Disclosure Statement dated Sep. 16, 2014.)

Search Report in corresponding Chinese Application No. 201280072335.3 dated Nov. 8, 2016. (References US2011075664A1, U.S. Pat. No. 6,658,571B1, US2011/1243146A1 and WO 2007/023467A2 were previously submitted with an Information Disclosure Statement dated Sep. 16, 2014.)

* cited by examiner

LAYER 3 SERVICE IMPLEMENTATION IN CLOUD SERVERS AND METHOD

TECHNICAL FIELD

The present invention generally relates to systems, software and methods and, more particularly, to mechanisms and techniques for implementing routing functionalities between L2 services in a virtual environment.

BACKGROUND

Cloud computing is the delivery of computing as a service rather than a product, whereby shared resources, software, and information are provided to computers and other devices as a utility over a network (e.g., the Internet). Cloud computing is a mature field when it comes to compute and storage services. Virtual Machines (VMs) can be acquired by users in matter of minutes using, for example, an application programming interface (API), e.g., RESTful, and storage resources can similarly be acquired and grown to an arbitrary size.

This type of data center environment allows enterprises to get their applications up and running faster, with easier manageability and less maintenance, and enables IT to more rapidly adjust IT resources (such as servers, storage, and networking) to meet fluctuating and unpredictable business demand.

In Infrastructure as a Service (IaaS), a basic cloud service model, the cloud providers offer to enterprises computers, as physical or more often as virtual machines, raw (block) storage, firewalls, load balancers, and networks. IaaS providers supply these resources to the enterprises, on demand, from their large pools installed in data centers. Local area networks including IP addresses are part of the offer. For the wide area connectivity, the Internet can be used or, in carrier clouds, dedicated virtual private networks can be configured.

Figure 1:
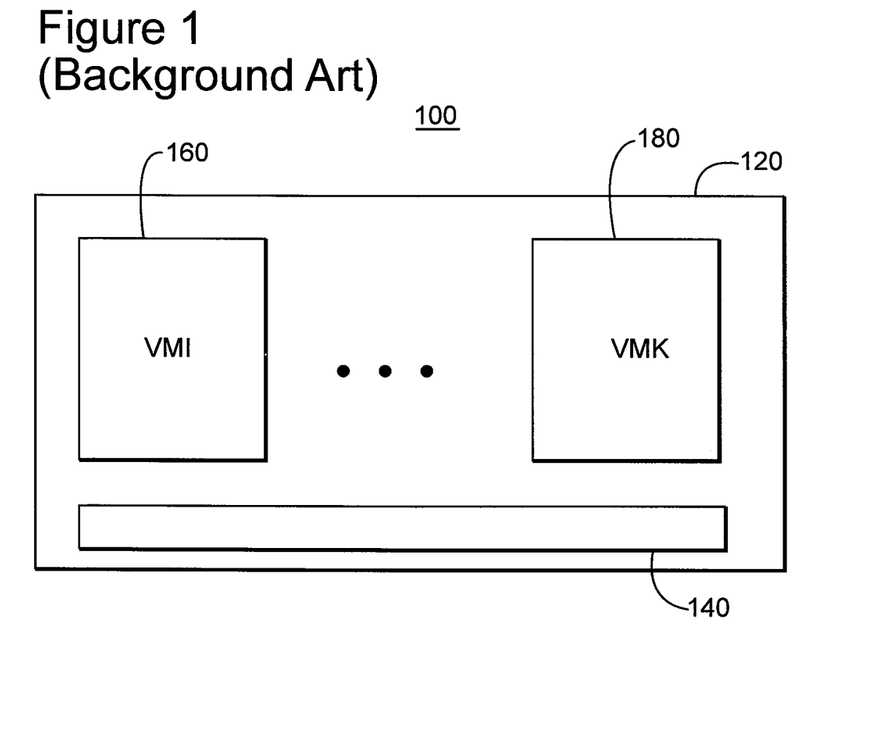
FIG. 1 is a schematic diagram of a virtual environment built on top of hardware components.

Virtual machine technology is well established. A system virtual machine provides a complete system platform which supports the execution of a complete operating system (OS). System virtual machines (sometimes called hardware virtual machines) allow the sharing of the underlying physical machine resources between different virtual machines, each running its own operating system. For example, FIG. 1 shows a system 100 that includes a computing device 120 having a virtualization engine 140, and plural virtual machines 160 to 180. The virtualization engine 140 providing the virtualization is called a virtual machine monitor or hypervisor. A hypervisor can run on bare hardware or on top of an operating system.

To allow legacy applications to run in a cloud or to incorporate remote cloud resources into on-site IT resources (such as server inside the internal corporate IT facilities), advanced and highly configurable cloud networking services are needed. Most of the IaaS providers, such as OpenStack, lack adequate cloud networking services.

Figure 2:
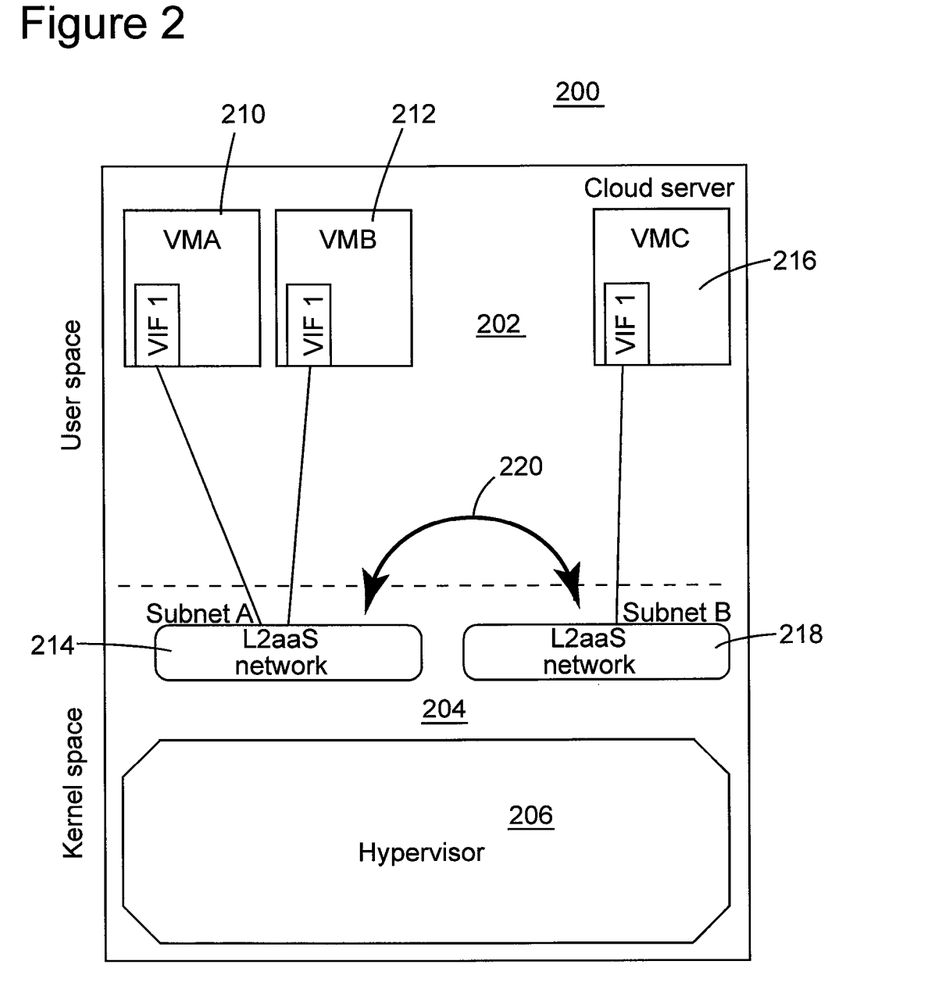
FIG. 2 is a schematic diagram illustrating a missing communication device between virtual networks inside a cloud server.

For example, FIG. 2 shows a cloud server 200 having a kernel space 204 and a user space 202. A conventional computer operating system usually segregates its functionality into kernel space and user space. Kernel space is strictly reserved for running the kernel, kernel extensions, and most device drivers. In contrast, user space is the runtime environment where all user mode application processes executes. These processes are scheduled by the kernel according to some scheduling algorithm. Similarly, in a cloud server, the operating system is segregated into the kernel space 204 and the user space 202. The hypervisor 206 is located in the kernel space 204 while various VMs 210 and 212 are normally located in the user space 202. Communication between the VM 210 and the VM 212 is achieved by a virtual switch 214, e.g., Open vSwitch, or a layer 2 as a service (L2aaS) network, e.g., a Quantum network. If another VM 216 is present in the user space 202, it may have its own L2aaS network 218. An L2aaS network effectively acts as a (possibly distributed) switch and it is known in the art as being an L2 layer service. It is noted that each VM has a virtual interface (VIF) for communicating with the L2aaS network.

However, one missing feature in most known platforms is the capability of supporting routing protocols, i.e., communication 220 (layer L3) between the L2aaS network 214 and L2aaS network 218. Currently, the user or some other entity needs to populate the forwarding tables. This makes it difficult for the cloud platform to interwork with L3 VPNs, which is required for establishing the inter-domain interaction.

Thus, there is a need to develop a mechanism that automatically populates the routing and forwarding tables needed by a layer L3 routing service.

SUMMARY

The possibility for enterprises of using computer facilities provided remotely by dedicated cloud servers is highly attractive. Thus, providers of the computer facilities are configuring their cloud servers to support various needs and multiple enterprises. One approach is to virtualize the hardware so that each enterprise can be offered a computing environment that is appropriate for their needs and it is blind to the actual hardware. However, the virtualization of the hardware implies, among others, communication among various virtual machines located in different parts of the cloud server or servers. The existing communication methods are slow and require input from the operator of the cloud. The novel concepts that are now discussed solve this problem by implementing L3 service in a virtual router in a kernel space.

According to one exemplary embodiment, there is a cloud server system having a cloud server configured to facilitate communication among plural networks established in the cloud server. The cloud server includes hardware components configured to process and store information and a hypervisor configured to run on the hardware components. The hypervisor is configured to provide a virtual platform in a kernel space. The cloud server further includes a first virtual machine running on the virtual platform in a user space; a first L2aaS network connected to the first virtual machine, the first L2aaS network being located in the kernel space; a second virtual machine running on the virtual platform in the user space; and a second L2aaS network connected to the second virtual machine, the second L2aaS network being located in the kernel space. The cloud server further includes a virtual router located in the kernel space and connected to the first L2aaS network and the second L2aaS network. The virtual router is configured to provide router functionality between the first and second L2aaS networks.

According to another exemplary embodiment, there is a method for facilitating communication among plural networks established in a cloud server belonging to a cloud server system. The method includes implementing a hypervisor to run on hardware components and configuring the hypervisor to provide a virtual platform in a kernel space; generating a first virtual machine to run on the virtual platform in a user space; creating a first L2aaS network connected to the first virtual machine, the first L2aaS network being located in the kernel space; generating a second virtual machine to run on the virtual platform in the user space; creating a second L2aaS network connected to the second virtual machine, the second L2aaS network being located in the kernel space; and instantiating a virtual router in the kernel space to communicate with the first L2aaS network and the second L2aaS network. The virtual router is configured to provide router functionality between the first and second L2aaS networks.

According to still another exemplary embodiment, a cloud server environment is configured to facilitate communication among plural networks established in the cloud server. The cloud server environment includes a hypervisor configured to run on the hardware components and also configured to provide a virtual platform in a kernel space; a first virtual machine running on the virtual platform in a user space; a first L2aaS network connected to the first virtual machine, the first L2aaS network being located in the kernel space; a second virtual machine running on the virtual platform in the user space; a second L2aaS network connected to the second virtual machine, the second L2aaS network being located in the kernel space; and a virtual router located in the kernel space and connected to the first L2aaS network and the second L2aaS network. The virtual router is configured to provide router functionality between the first and second L2aaS networks.

Thus, it is an object to overcome some of the deficiencies discussed in the previous section and to provide a L3 services between virtual networks inside a cloud server. One or more of the independent claims advantageously provides such services.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a cloud server. However, the novel embodiments are not limited to the cloud server, but may be applied to other types of systems that use virtual machines.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

According to an exemplary embodiment, there is a cloud server that combines the usage of hypervisor-based virtualization with container-based virtualization to implement L3 routing functionality and support for routing protocols like Open Shortest Path First and Border Gateway Protocol. For example, as will be discussed later in more detail, a container is created for each logical router that is needed. In addition, one virtual interface per layer 2 network between which the logical router will perform L3 service, e.g., packet forwarding, is created. Alternatively, instead of using a logical router, a virtual switch may be used, with no container-based virtualization, to provide the L3 service between various virtual networks. Thus, the generic name of "virtual router" is introduced herein to cover both these possibilities or others.

Figure 3:
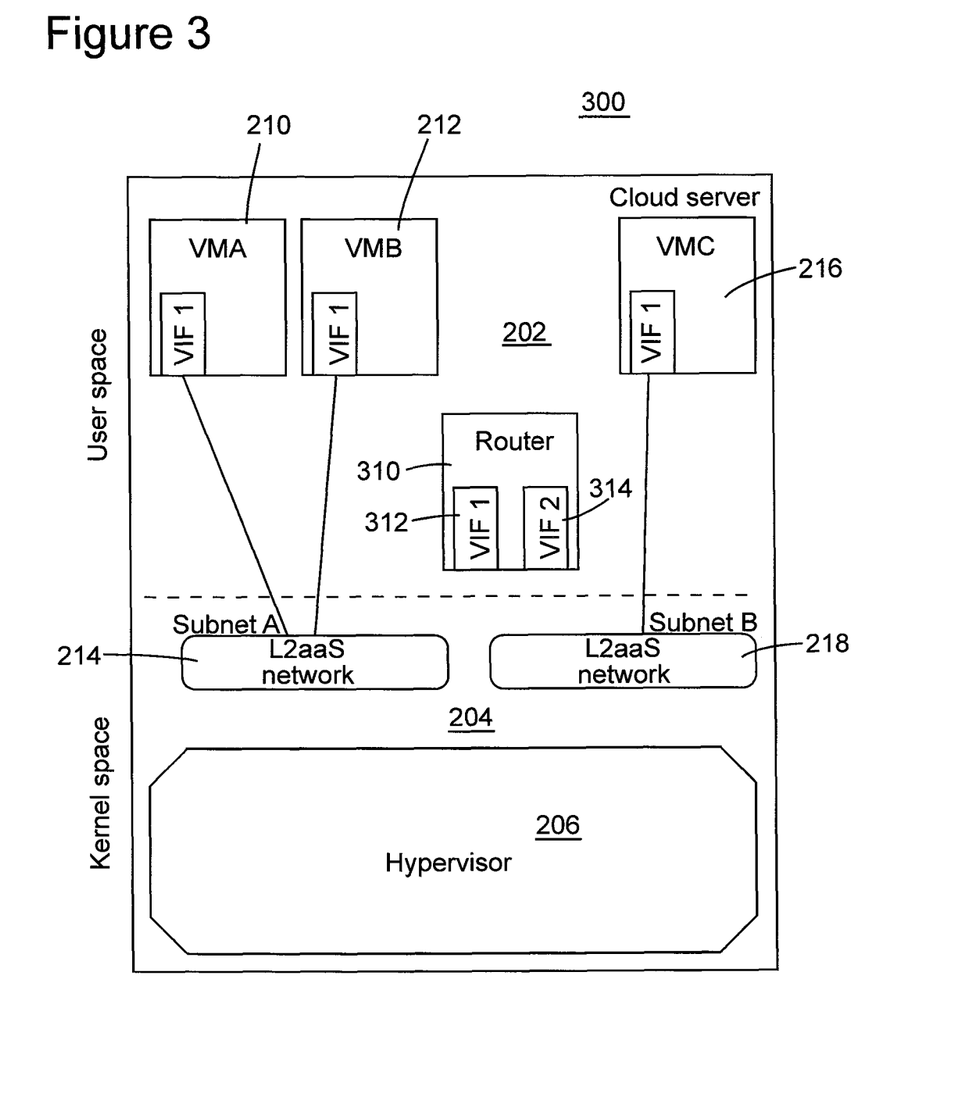
FIG. 3 is a schematic diagram of a router provided in a user space.

According to an exemplary embodiment illustrated in FIG. 3, it is possible to implement in a system 300, which is similar to the system illustrated in FIG. 2, a router functionality 310 in the user space 202. The router functionality 310 may be implemented in a virtual machine and will have at least a first virtual interface 312 for communicating with the L2aaS network 214 and a second virtual interface 314 for communicating with the L2aaS network 218.

However, this solution has the following limitation. In order to transmit data from the kernel space to the user space or vice versa, a scheduler in the operation system is involved and a time for transmitting the data is increased.

Figure 4A:
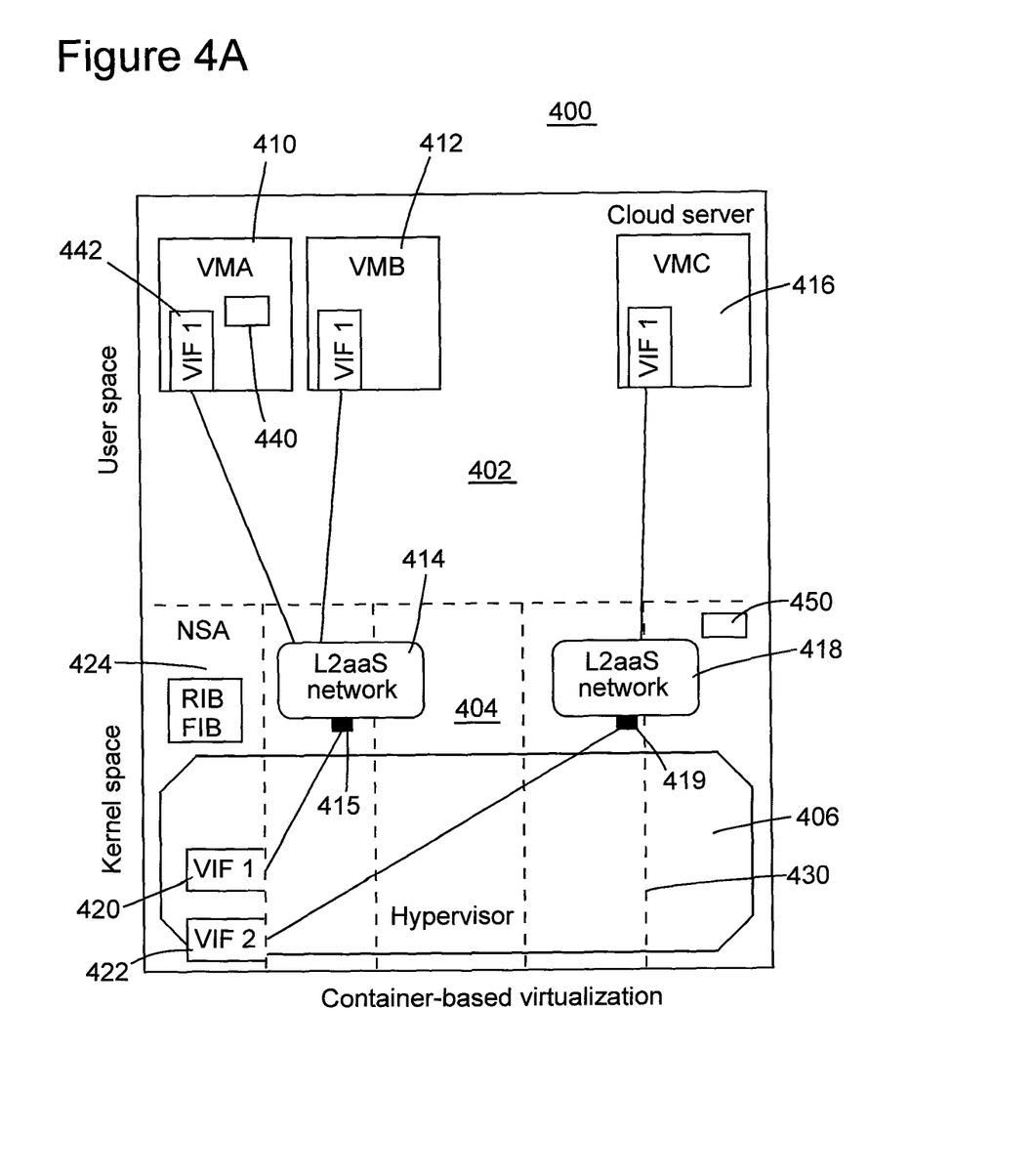
FIG. 4A is a schematic diagram of a virtual router provided in a kernel space for providing L3 services in an exemplary embodiment.

Thus, according to an exemplary embodiment illustrated in FIG. 4A, a router functionality is implemented in the kernel space into a virtual router and the communication between the L2aaS networks takes place in the kernel space instead of being distributed in the kernel space and the user space. FIG. 4A shows a cloud server system including a cloud server 400 in which a first VM 410 and a second VM 412 in the user space 402 are connected to a L2aaS network 414 (i.e., layer 2 service) and a third VM 416 is connected to a L2aaS network 418. The L2aaS networks 414 and 418 are provided in the kernel space 404 and are connected to corresponding virtual interfaces 420 and 422 of a virtual router 424. The virtual router 424 automatically provides the router functionality between the L2aaS networks 414 and 418 in the kernel space 404.

In one application, the virtual router 424 is considered to be a namespace in a Linux environment, i.e., it is a feature of the Linux kernel that allows different processes to have a different view on the filesystem. Normally, there is just a single filesystem tree with different mounts here and there. With namespaces, it is possible to have different mounts/views for different processes. This means that if process A and process B are in different namespaces, (un-)mounting in one namespace does not affect the other namespace. When something is mounted, it only appears in the current namespace and something is unmounted it only disappears in the current namespace.

It is noted that the hypervisor 406 provides one type of virtualization of the underlying hardware (not shown) of the cloud server 400 while the virtual router 424 is part of a container-based virtualization 430 of the same underlying hardware. In this regard, a hypervisor virtualization implies running a full operating system on top of a host operating system, usually a mixture of operating systems. For example, running Red Hat Enterprise Linux and Microsoft Server on top of a Red Hat Enterprise Linux (RHEL) host using VMware or Xen. Container-based virtualization is also called operating system virtualization. The container-based virtualization, instead of trying to run an entire separate guest OS, isolates the guests (of same OS as the host runs), but does not virtualize the hardware in the same fashion as hypervisor-based virtualization does. Thus, this virtualization has containers (hence the name) for each virtual environment, i.e., for each virtual router.

In this way, if a packet 440 needs to be transmitted from the VM 410 to the VM 416, the packet travels from the VM 410 to a virtual interface 442, then to the L2aaS network 414, then to the virtual interface 420 of the virtual router 424, then to the virtual interface 422, then to the L2aaS network 418 and finally arrives at VM 416. In this way, the entire path between the L2aaS network 414 and the L2aaS network 418 takes place in the kernel space 404, which reduces the travel time. Further, the novel virtual router 424 implemented in the kernel space automatically forwards the packet from one L2aaS network to another L2aaS network without intervention from the operator of the kernel space.

It is noted that the virtual router 424 is the L3 layer and is based on the container-based virtualization and not the hypervisor virtualization used by the VMs 410, 412, and 416. In other words, two different virtualizations are used in the cloud server 400, one for the VMs and one for the router functionality. Further, it is noted that more router functionalities may be used, one for each container in the container-based virtualization 430 as the needs require. The example shown in FIG. 4A illustrates only a single virtual router 424 for simplicity. A virtual router may be associated with a single client. Thus, in the example of FIG. 4A, a single client (enterprise) uses the VMs 410, 412, and 416 provided by the cloud server 400. If more clients are using VMs of the same cloud server 400, each client is assigned its own virtual router, VMs, L2aaS networks, etc. Thus, the virtual router of a single client connects together the L2aaS networks of that client.

The virtual router and/or the VMs may be created in the cloud server 400 by a cloud platform controller (CPC) 450. The CPC 450 may be provided inside the cloud server, outside the cloud server or distributed at various cloud servers. The CPC 450 is responsible for creating the virtualization containers for the L3 service (i.e., virtual router). The CPC 450 may also create in the virtual router 424 one virtual interface per L2 network (i.e., L2aaS network) in the virtualization container, e.g., VIF1 420 and VIF2 422 in FIG. 4A. A port (415 and is created on each L2 network for each virtual interface created in the virtual router so that the each port communicates with a corresponding virtual interface in the virtual router.

Figure 4B:
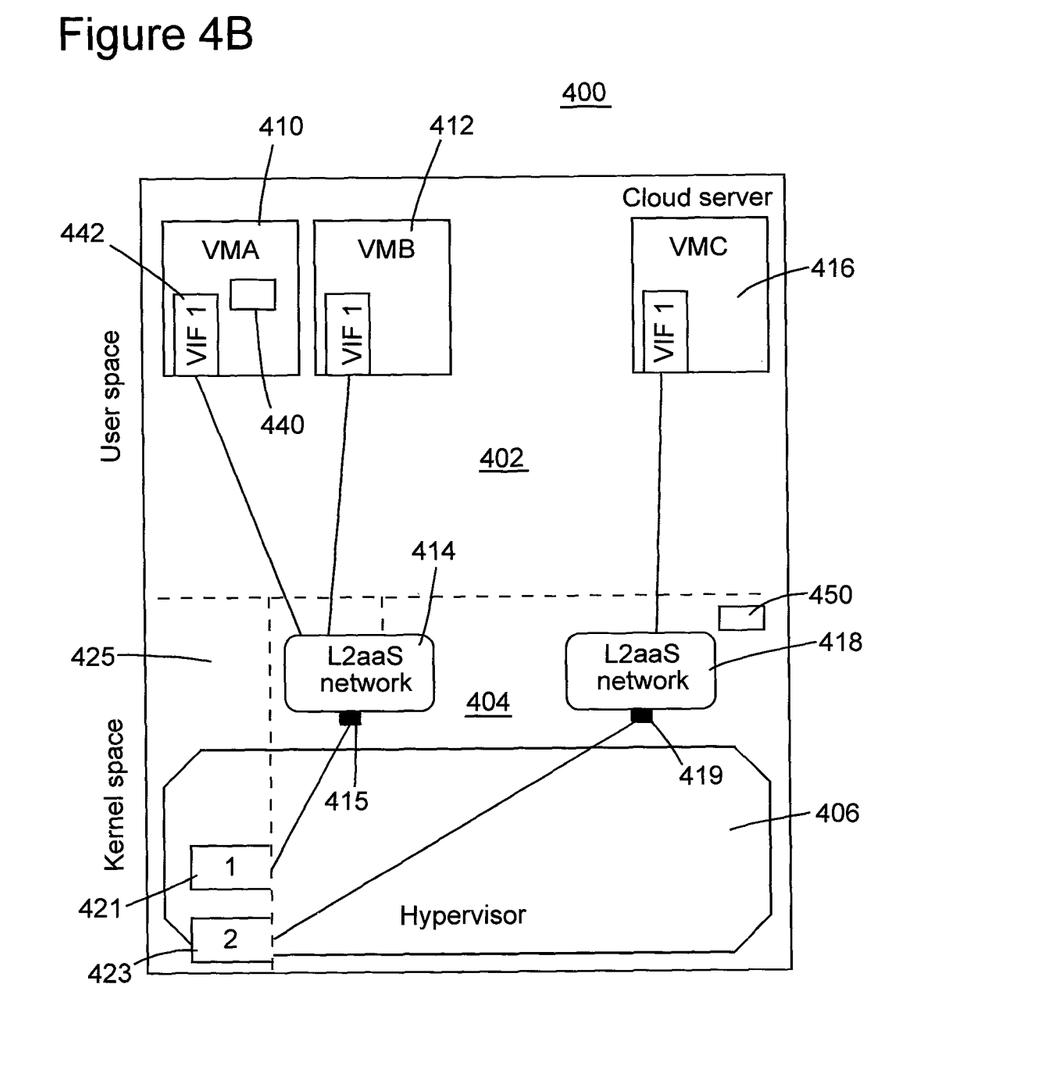
FIG. 4B is a schematic diagram of a virtual switch provided in a kernel space for providing L3 services in an exemplary embodiment.

Alternatively, instead of implementing the virtual router in a container based on container virtualization as shown in FIG. 4A, the virtual router may be implemented as a virtual switch 425 as illustrated in FIG. 4B. The virtual switch 425 needs to have router capabilities, i.e., to provide L3 service. Instead of having virtual interfaces, the virtual switch 425 has virtual ports 412 and 423 for connecting to the L2aaS networks.

Figure 5:
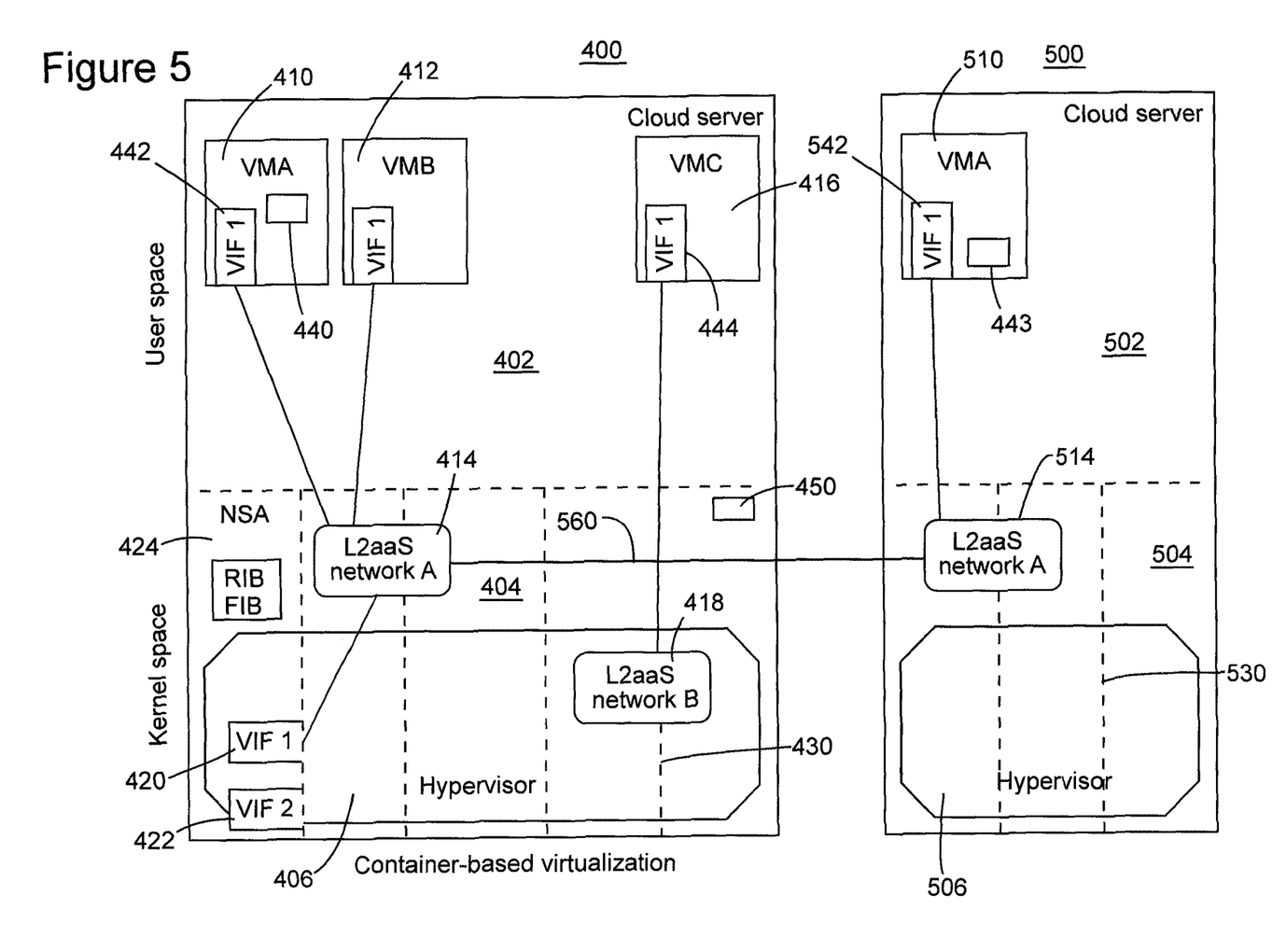
FIG. 5 is a schematic diagram of a virtual router provided in a kernel space for providing L3 services in another exemplary embodiment.

The novel aspects discussed above may be extended to multiple cloud servers as illustrated in FIG. 5. Consider the cloud server 400 of FIG. 4A and also a new cloud server 500. The two cloud servers 400 and 500 may have the same geographical location or they may be located at different geographical locations. The second cloud server 500 also has a user space 502 and a kernel space 504 similar to the cloud server 400. A hypervisor 506 manages the VMs and the cloud server 500 includes at least one VM 510. The VM 510 is connected to the L2aaS network 514 that is part of the L2aaS network 414. In other words, the L2aaS network 414 spans plural cloud servers and this is indicated by link 560.

Thus, a packet 440 at the VM 410 propagates as described next to the VM 510. The VM 510 is used by the same client that uses the VM 410. The packet 440 travels from VM 410 to the virtual interface 442, L2aaS network 414, link 560 to the L2aaS network 514, virtual interface 542 and VM 510. In this way, the virtual router 424 is not involved in the packet transmission.

However, if a packet 443 needs to be transmitted from the VM 510 to the VM 416, which are connected to different L2aaS networks, the virtual router 424 becomes involved for linking the two L2aaS networks. A path to be followed by the packet 443 is as follows. The packet 443 leaves the VM 510 through the virtual interface 542 and travels to the L2aaS network 514, link 560, L2aaS network 414, virtual interface 420 in the virtual router 424, virtual interface 422, L2aaS network 418, virtual interface 444 and VM 416.

As noted above, the example shown in FIG. 5 illustrates, for simplicity, only two cloud servers and two L2aaS networks. However, the novel virtual router can be applied to many cloud servers having many L2aaS networks.

Figure 6:
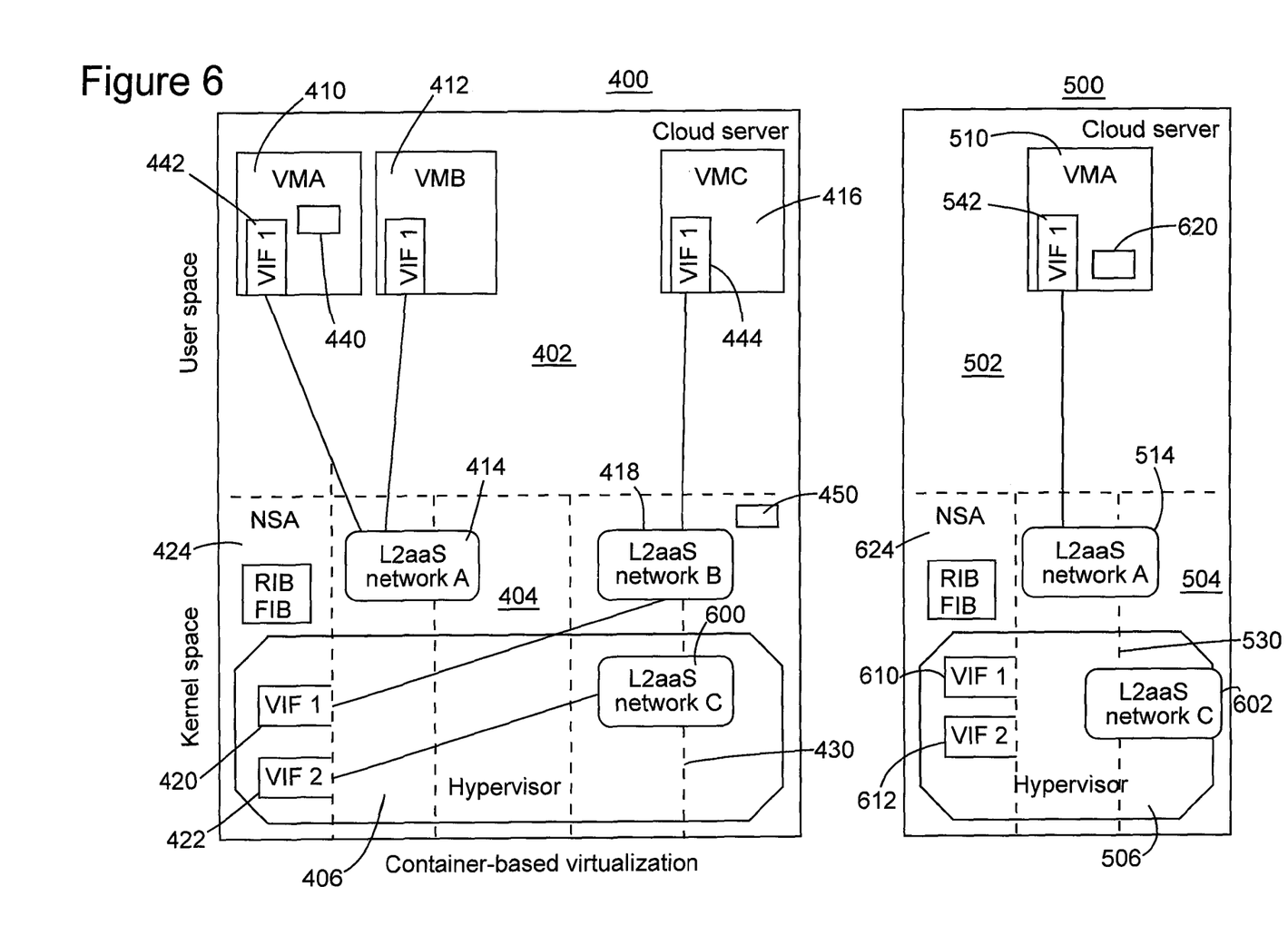
FIG. 6 is a schematic diagram of a virtual router distributed in kernel spaces of two cloud servers for providing L3 services according to an exemplary embodiment.

A more complex system is now discussed with regard to FIG. 6. In this exemplary embodiment, there are two cloud servers 400 and 500. There is a third L2aaS network 600 and 602 that is distributed in the cloud servers 400 and 500, respectively. A link between L2aaS networks 600 and 602 is omitted for simplicity. Similarly, a link between the L2aaS networks 414 and 514 is omitted for simplicity. The virtual router 424 is also present (instantiated) as element 624 in the cloud server 500. Thus, the virtual router 624 has a first virtual interface 610 connected to L2aaS network 514 and a second virtual interface 612 connected to L2aaS network 602.

With this structure, when a packet 620 needs to be exchanged between the VM 510 and the VM 416, the following path is used. The packet 620 travels to the virtual interface 542 of the VM 510, then to the L2aaS network 514, virtual interface 610 of the virtual router 624, virtual interface 612, L2aaS network 602, L2aaS network 600 in the first cloud server 400, virtual interface 422 of the virtual router 424, virtual interface 420, L2aaS network 418, virtual interface 444 and finally VM 416. In this case, the virtual router 624 establishes the communication between L2aaS networks 514 and 602, the virtual router 424 establishes the communication between L2aaS networks 418 and 600 and the L2aaS network 600 and 602 establishes the communication across different cloud servers.

Those skilled in the art would be able, based on the novel concepts introduced above, to extend the communications among L2aaS networks across various cloud servers so that any actual system may use the automatic virtual router of the embodiments presented herein. As for the previous figures, the VMs illustrated in FIG. 6 are considered to be offered for use as a service to a single client (enterprise). Of course, an actual cloud system will have many more VMs that are offered to various clients and, thus, many router functionalities would be implemented in the container-based virtualization of the underlying hardware.

One advantage of the novel method is the implementation of advanced routing functionality while reducing implementation complexity. Also, the number of context switches is kept low, thereby increasing the performance.

Figure 7:
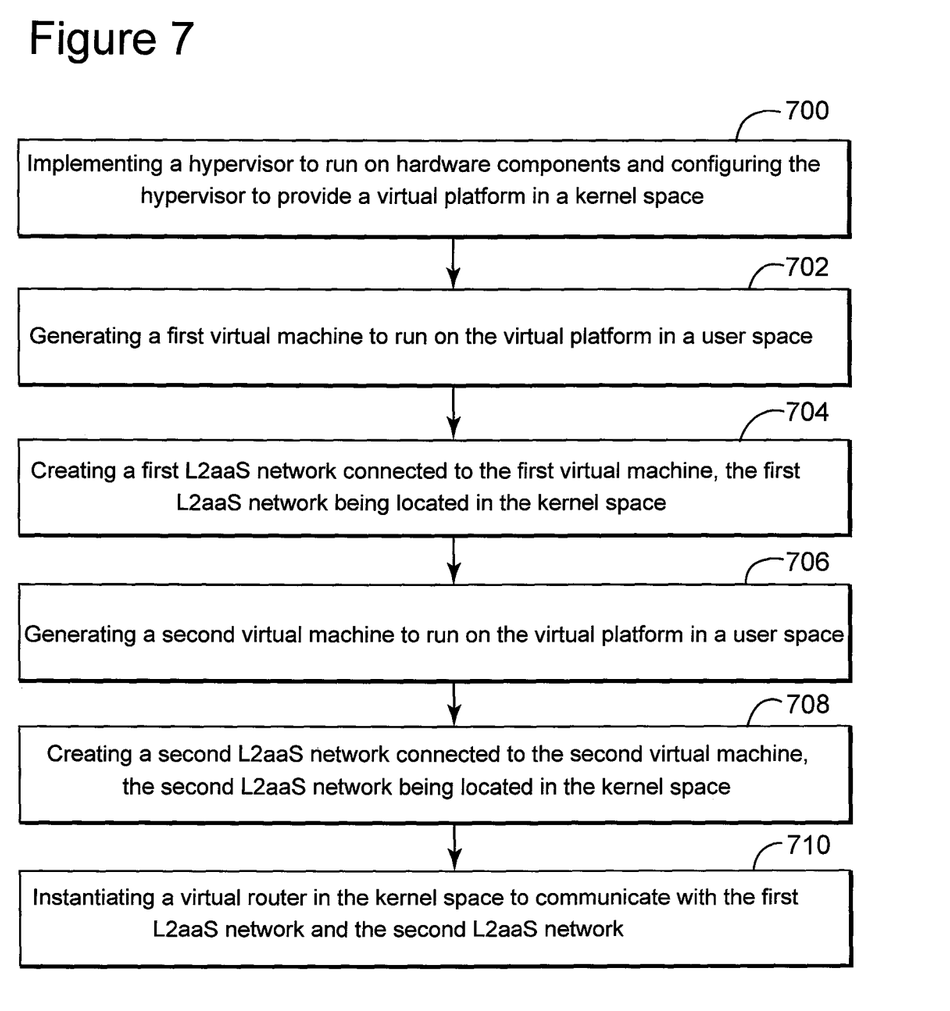
FIG. 7 is a flowchart of a method for instantiating a virtual router for providing L3 services according to an exemplary embodiment.

A method that implements the above noted virtual router is now discussed with reference to FIG. 7. FIG. 7 is a flowchart of a method for facilitating communication among plural networks established in a cloud server belonging to a cloud server system. The method includes a step 700 of implementing a hypervisor to run on hardware components and configuring the hypervisor to provide a virtual platform in a kernel space; a step 702 of generating a first virtual machine to run on the virtual platform in a user space; a step 704 of creating a first L2aaS network connected to the first virtual machine, the first L2aaS network being located in the kernel space; a step 706 of generating a second virtual machine to run on the virtual platform in the user space; a step 708 of creating a second L2aaS network connected to the second virtual machine, the second L2aaS network being located in the kernel space; and a step 710 of instantiating a virtual router in the kernel space to communicate with the first L2aaS network and the second L2aaS network. The virtual router is configured to provide router functionality between the first and second L2aaS networks.

Figure 8:
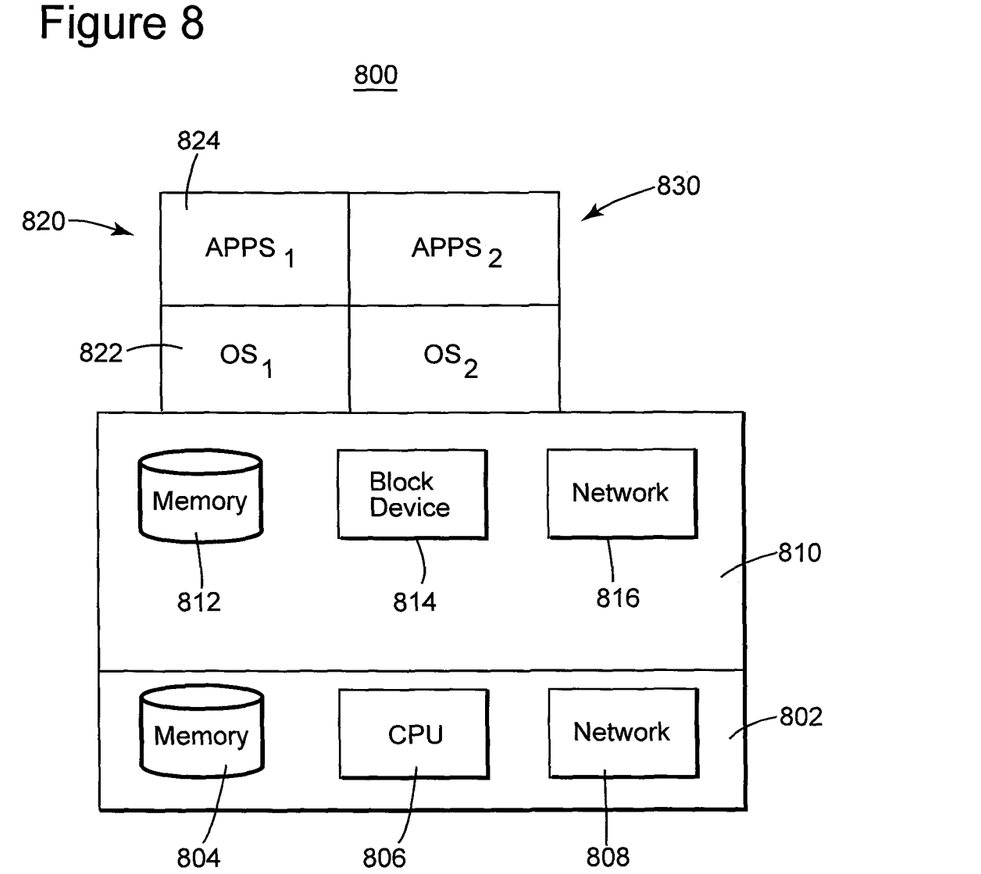
FIG. 8 illustrates an architecture of a hypervisor and a platform provided in top of hardware components.

A relation between the hardware underlying the virtualization, the hypervisor, the L2aaS networks, and the virtual machines is generically illustrated in FIG. 8. FIG. 8 shows a cloud server 800 having hardware components 802 as known in the art, e.g., memory 804, processor 806, network components 808, etc. The hypervisor 810 is provided on top of the hardware and generates the platform for the various operation systems to be implemented. The platform may include virtual memory 812, a disk 814 and network components 816. Then, a virtual machine 820 may be implemented by the hypervisor. The virtual machine 820 may have an operation system 822 and various applications 824. Other virtual machines 830 may also be implemented in top of the hypervisor.

Figure 9:
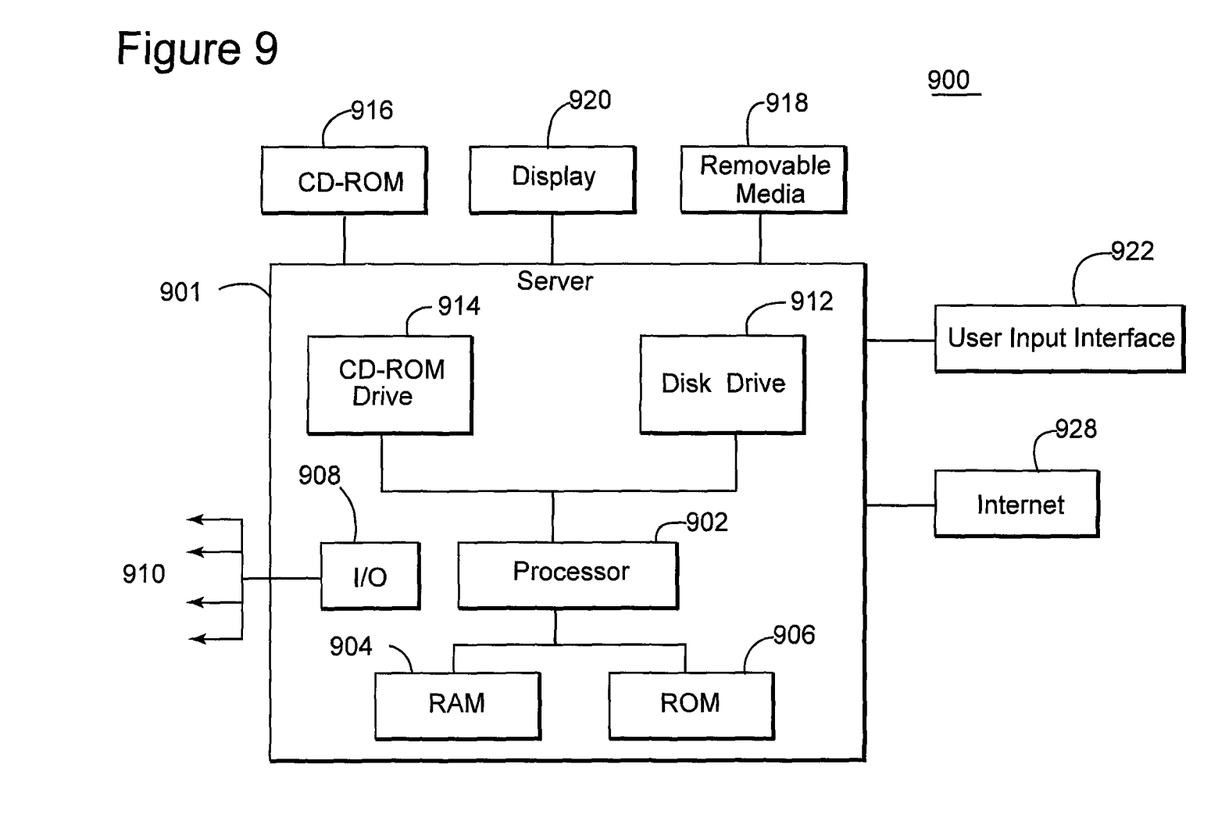
FIG. 9 is a schematic diagram of a cloud server.

For purposes of illustration and not of limitation, an example of a representative cloud server structure (hardware part) capable of carrying out operations in accordance with the exemplary embodiments is illustrated in FIG. 9. Hardware, firmware, software or a combination thereof may be used to perform the various steps and operations described herein.

The exemplary peer structure 900 suitable for performing the activities described in the exemplary embodiments may include or not a server 901. Such a server 901 may include a central processor (CPU) 902 coupled to a random access memory (RAM) 904 and to a read-only memory (ROM) 906. The ROM 906 may also be other types of storage media to store programs, such as programmable ROM (PROM), erasable PROM (EPROM), etc. The processor 902 may communicate with other internal and external components through input/output (I/O) circuitry 908 and bussing 910, to provide control signals and the like. The processor 902 carries out a variety of functions as is known in the art, as dictated by software and/or firmware instructions.

The server 901 may also include one or more data storage devices, including hard and disk drives 912, CD-ROM drives 914, and other hardware capable of reading and/or storing information such as DVD, etc. In one embodiment, software for carrying out the above discussed steps may be stored and distributed on a CD-ROM 916, removable media 918 or other form of media capable of portably storing information. These storage media may be inserted into, and read by, devices such as the CD-ROM drive 914, the disk drive 912, etc. The server 901 may be coupled to a display 920, which may be any type of known display or presentation screen, such as LCD displays, LED displays, plasma displays, cathode ray tubes (CRT), etc. A user input interface 922 is provided, including one or more user interface mechanisms such as a mouse, keyboard, microphone, touch pad, touch screen, voice-recognition system, etc.

The server 901 may be coupled to other computing devices, such as the landline and/or wireless terminals, via a network. The server may be part of a larger network configuration as in a global area network (GAN) such as the Internet 928, which allows ultimate connection to the various landline and/or mobile client/watcher devices.

The disclosed exemplary embodiments provide a cloud server, method and computer instruction for implementing L3 service between L2 service providing networks in a virtual computing environment. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A cloud server system having a cloud server configured to facilitate communication among plural networks established in the cloud server, the cloud server comprising:
   hardware components, of the cloud server, configured to process and store information;
   a hypervisor configured to run on the hardware components and also configured to provide hypervisor virtualization by providing a virtual platform in a kernel space of the cloud server, wherein the hypervisor is located in the kernel space;
   a first virtual machine running on the virtual platform in a user space of the cloud server;
   a first L2aaS network connected to the first virtual machine, the first L2aaS network being located in the kernel space of the cloud server;
   a second virtual machine running on the virtual platform in the user space of the cloud server;
   a second L2aaS network connected to the second virtual machine, the second L2aaS network being located in the kernel space of the cloud server;
   a virtual router located in the kernel space and connected to the first L2aaS network and the second L2aaS network of the cloud server,
   wherein the virtual router is a logical router and is configured to automatically provide router functionality, without requiring a switch table, between the first and second L2aaS networks such that communications between the first and second L2aaS networks occur in the kernel space and the communications are not distributed in both the kernel space and the user space, and wherein only the virtual router provides the router functionality between the first and second L2aaS networks,
   wherein, in addition to the hypervisor virtualization located in the kernel space, a container-based virtualization, also located in the kernel space, is implemented on the same hardware components as the hypervisor, and the virtual router is located in a single container of the container-based virtualization and not the hypervisor virtualization; and wherein the first and second virtual machines correspond to the hypervisor virtualization; and
   a cloud management module, executed by the hardware components, configured to create a first virtual interface for the first L2aaS network and a second virtual interface for the second L2aaS network, wherein the first and second virtual interfaces are located within the hypervisor and a packet is transmitted from the first virtual machine to the second virtual machine using the first and second virtual interfaces.

2. The cloud server system of claim 1, wherein the virtual router is implemented in a namespace in a linux environment.

3. The cloud server system of claim 1, wherein the first and second L2aaS networks provide layer 2 services.

4. The cloud server system of claim 1, wherein the virtual router provides layer 3 service.

5. The cloud server system of claim 1, wherein the first and second virtual machines are configured to exchange packet data through the first and second L2aaS networks and the virtual router.

6. The cloud server system of claim 1, wherein the first and second virtual machines and the virtual router have virtual interfaces for exchanging a packet data.

7. The cloud server system of claim 1, further comprising:
   another cloud server having a kernel space and a user space
   a hypervisor in the kernel space;
   a third virtual machine in the user space; and
   a third L2aaS network in the kernel space, the third L2aaS network being connected to the third virtual machine.

8. The cloud server system of claim 7, wherein the third L2aaS network in the another cloud server and the first L2aaS network of the cloud server are components of a same L2aaS network.

9. The cloud server system of claim 8, wherein a packet data from the third virtual machine of the another cloud server travels through the third L2aaS network in the another cloud server, the first L2aaS network, the virtual router, and the second L2aaS network to arrive at the second virtual machine.

10. The cloud server system of claim 1, further comprising:
    another cloud server having a kernel space and a user space
    a hypervisor in the kernel space;
    a third virtual machine in the user space of the another cloud server;
    a third L2aaS network in the kernel space, the third L2aaS network being connected to the third virtual machine;
    a fourth L2aaS network in the kernel space of the another cloud server; and
    another virtual router in the kernel space of the another cloud server.

11. The cloud server system of claim 10, wherein the another virtual router provides router functionality between the third L2aaS network and the fourth L2aaS network.

12. The cloud server system of claim 11, wherein the third L2aaS network in the another cloud server and the first L2aaS network of the cloud server are components of a same L2aaS network and the virtual router in the cloud server and the another virtual router in the another cloud server are components of a same virtual router.

13. The cloud server system of claim 10, wherein a packet data from the third virtual machine of the another cloud server travels through the third L2aaS network, the another virtual router, the fourth L2aaS network, the virtual router, and the second L2aaS network to arrive at the second virtual machine.

14. The cloud server system of claim 10, wherein the another virtual router is implemented in a namespace in a linux environment.

15. The cloud server system of claim 10, wherein a container-based virtualization is implemented on hardware components of the another cloud server and the another virtual router corresponds to a single container of the container-based virtualization.

16. A method for facilitating communication among plural networks established in a cloud server belonging to a cloud server system, the method comprising:
    implementing a hypervisor to run on hardware components of the cloud server and configuring the hypervisor to provide hypervisor virtualization by providing a virtual platform in a kernel space of the cloud server, wherein the hypervisor is located in the kernel space;
    generating a first virtual machine to run on the virtual platform in a user space of the cloud server;

creating a first L2aaS network connected to the first virtual machine, the first L2aaS network being located in the kernel space of the cloud server;
generating a second virtual machine to run on the virtual platform in the user space of the cloud server;
creating a second L2aaS network connected to the second virtual machine, the second L2aaS network being located in the kernel space of the cloud server;
instantiating a virtual router in the kernel space of the cloud server to communicate with the first L2aaS network and the second L2aaS network,
wherein the virtual router is a logical router and is configured to automatically provide router functionality, without requiring a switch table, between the first and second L2aaS networks such that communications between the first and second L2aaS networks occur in the kernel space and the communications are not distributed in both the kernel space and the user space, and wherein only the virtual router provides the router functionality between the first and second L2aaS networks,
wherein, in addition to the hypervisor virtualization, located in the kernel space, a container-based virtualization, also located in the kernel space, is implemented on the same hardware components as the hypervisor and the virtual router is located in a single container of the container-based virtualization and not the hypervisor virtualization, and wherein the first and second virtual machines correspond to the hypervisor virtualization; and
creating a first virtual interface for the first L2aaS network and a second virtual interface for the second L2aaS network, wherein the first and second virtual interfaces are located within the hypervisor and a packet is transmitted from the first virtual machine to the second virtual machine using the first and second virtual interfaces.

17. A cloud server environment configured to facilitate communication among plural networks established in the cloud server, the cloud server environment comprising:
a cloud server, further comprising:
a hypervisor configured to run on the hardware components and also configured to provide hypervisor virtualization by providing a virtual platform in a kernel space, wherein the hypervisor is located in the kernel space;
a first virtual machine running on the virtual platform in a user space;
a first L2aaS network connected to the first virtual machine, the first L2aaS network being boated in the kernel space;
a second virtual machine running on the virtual platform in the user space;
a second L2aaS network connected to the second virtual machine, the second L2aaS network being boated in the kernel space;
a virtual router located in the kernel space and connected to the first L2aaS network and the second L2aaS network,
wherein the virtual router is a logical router and is configured to automatically provide router functionality, without requiring a switch table, between the first and second L2aaS networks such that communications between the first and second L2aaS networks occur in the kernel space and the communications are not distributed in both the kernel space and the user space, and wherein only the virtual router provides the router functionality between the first and second L2aaS networks,
wherein, in addition to the hypervisor virtualization, located in the kernel space, a container-based virtualization, also boated in the kernel space, is implemented on the same hardware components as the hypervisor and the virtual router is located in a single container of the container-based virtualization and not the hypervisor virtualization, and wherein the first and second virtual machines correspond to the hypervisor virtualization; and
a cloud management module, executed by the hardware components, configured to create a first virtual interface for the first L2aaS network and a second virtual interface for the second L2aaS network, wherein the first and second virtual interfaces are located within the hypervisor and a packet is transmitted from the first virtual machine to the second virtual machine using the first and second virtual interfaces.

* * * * *